Dec. 1, 1936.  W. L. MORRISON  2,062,327

BUMPER DEVICE FOR VEHICLES

Filed Sept. 26, 1933  3 Sheets-Sheet 1

Inventor:
Willard L. Morrison
By Parker & Carter
Attys.

Dec. 1, 1936. W. L. MORRISON 2,062,327
BUMPER DEVICE FOR VEHICLES
Filed Sept. 26, 1933 3 Sheets-Sheet 2
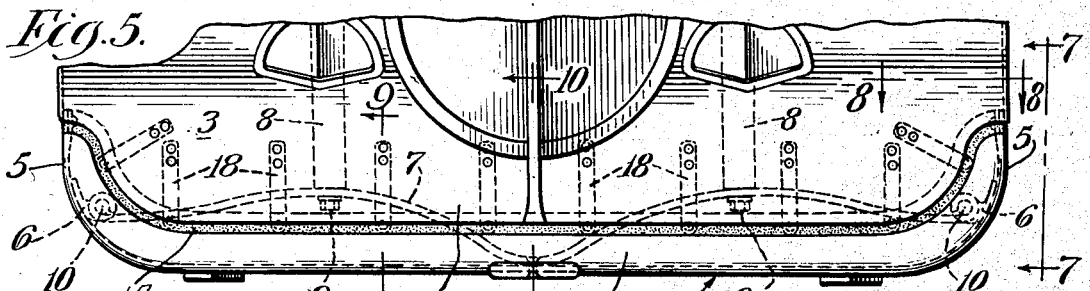
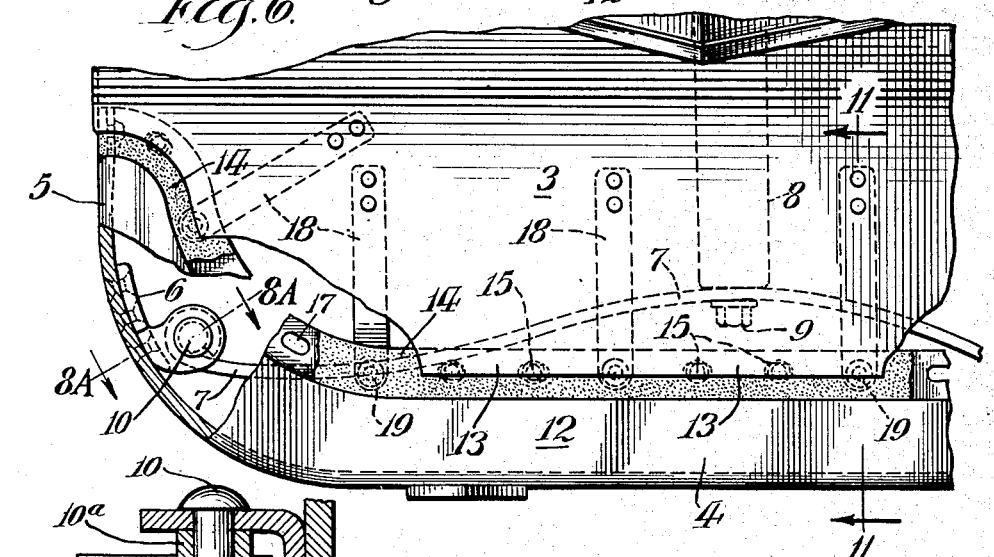
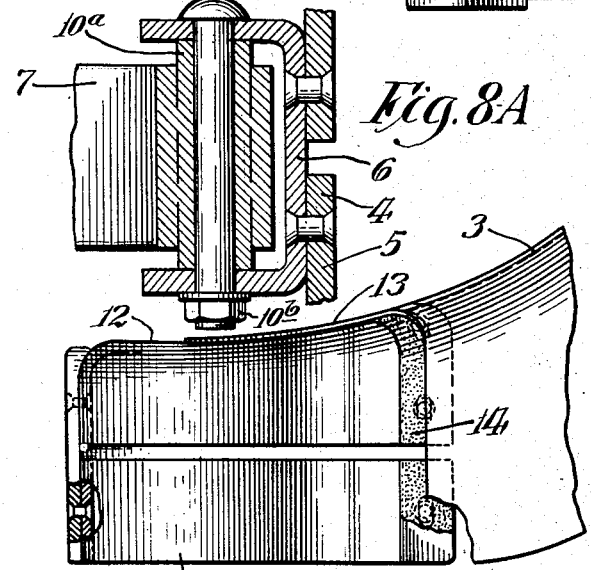
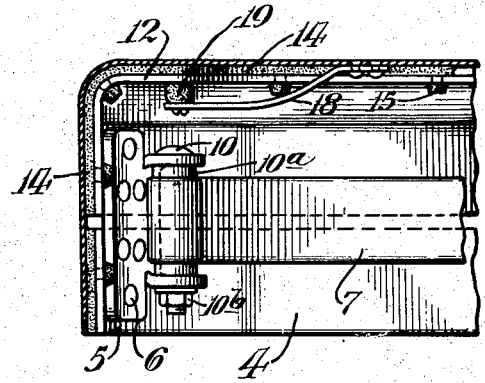
Inventor:
Willard L. Morrison,
By Parker & Carter
Attys.

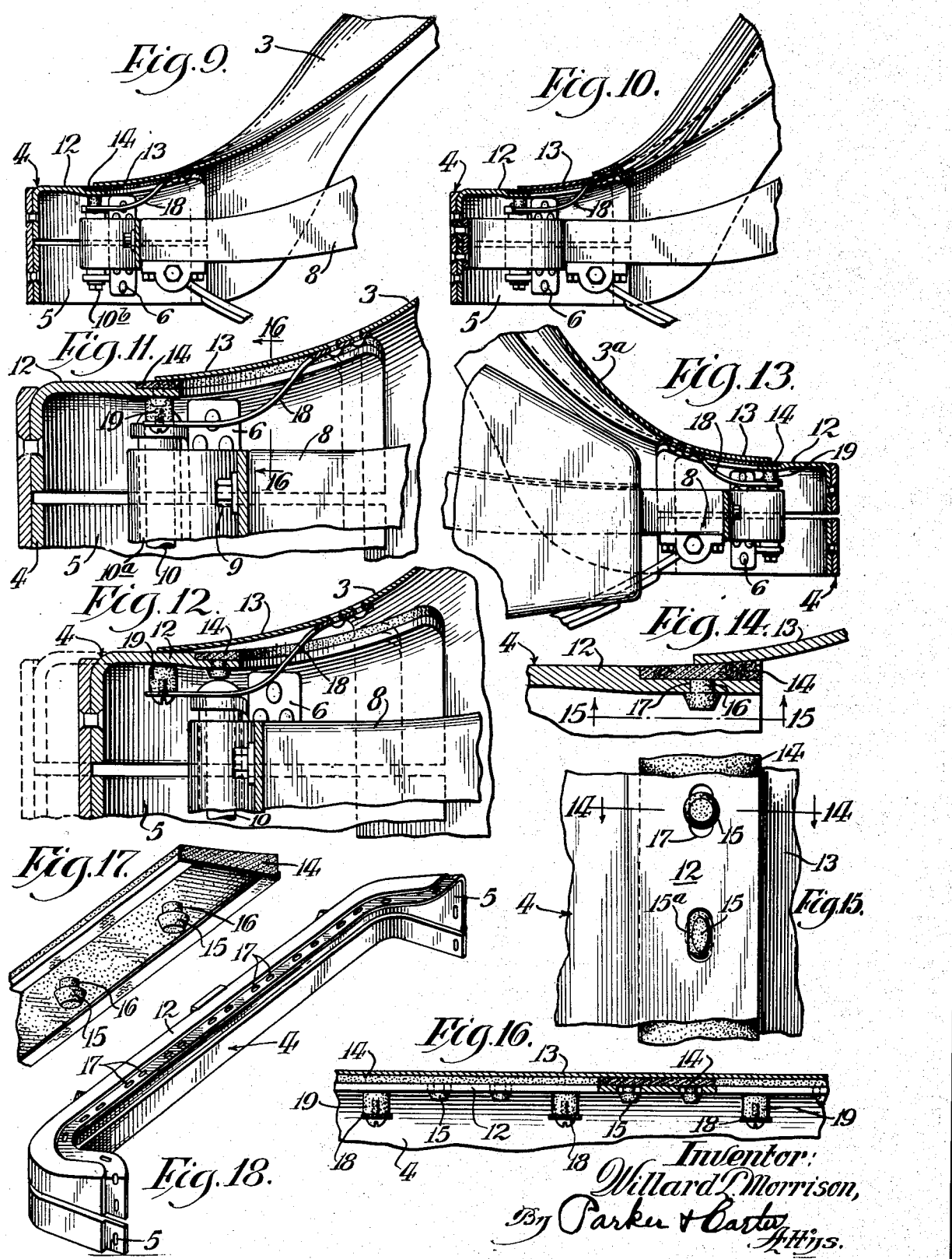

Patented Dec. 1, 1936

2,062,327

UNITED STATES PATENT OFFICE 2,062,327

BUMPER DEVICE FOR VEHICLES

Willard L. Morrison, Lake Forest, Ill.

Application September 26, 1933, Serial No. 691,010

6 Claims. (Cl. 293—55)

This invention relates to bumper devices for vehicles and has for its object to provide a new and improved device of this description. The invention has as a further object to provide a bumper device where the thrust receiving part or bumper element joins with the body portion in a symmetrical manner so as to practically form a part thereof. The invention has as a further object to provide such a device wherein the bumper element projects under the body portion and slides with relation thereto when struck. The invention has other objects which are more particularly pointed out in the accompanying description.

Referring now to the drawings, Fig. 1 is a view showing a vehicle with a bumper device embodying the invention;

Fig. 5 is an enlarged plan view of the front bumper construction;

Fig. 6 is an enlarged view of a portion of the bumper construction shown in Fig. 5;

Fig. 7 is an enlarged view taken on line 7—7 of Fig. 5;

Fig. 8 is a sectional view taken on line 8—8 of Fig. 5;

Fig. 8a is a sectional view taken on line 8a—8a of Fig. 6;

Fig. 9 is an enlarged sectional view taken on line 9—9 of Fig. 5;

Fig. 10 is an enlarged sectional view taken on line 10—10 of Fig. 5;

Fig. 11 is an enlarged sectional view taken on line 11—11 of Fig. 6;

Fig. 12 is a view similar to Fig. 11 showing the parts after the bumper element has been struck;

Fig. 13 is a view in part section showing the rear bumper construction;

Fig. 14 is a sectional view taken on line 14—14 of Fig. 15;

Fig. 15 is a sectional view taken on line 15—15 of Fig. 14;

Fig. 16 is a sectional view taken on line 16—16 of Fig. 11;

Fig. 17 is a perspective view of the rubbing contacting element between the bumper element and the vehicle body;

Fig. 18 is a perspective view of the bumper element.

Like numerals refer to like parts throughout the several figures.

Figure 1:
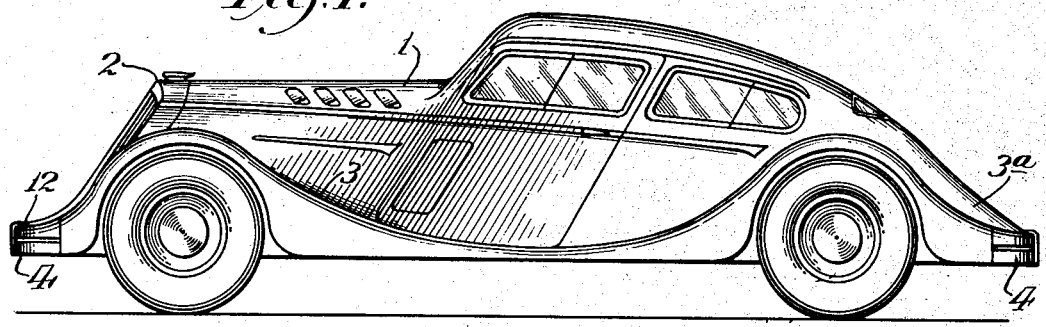
Figure 2:
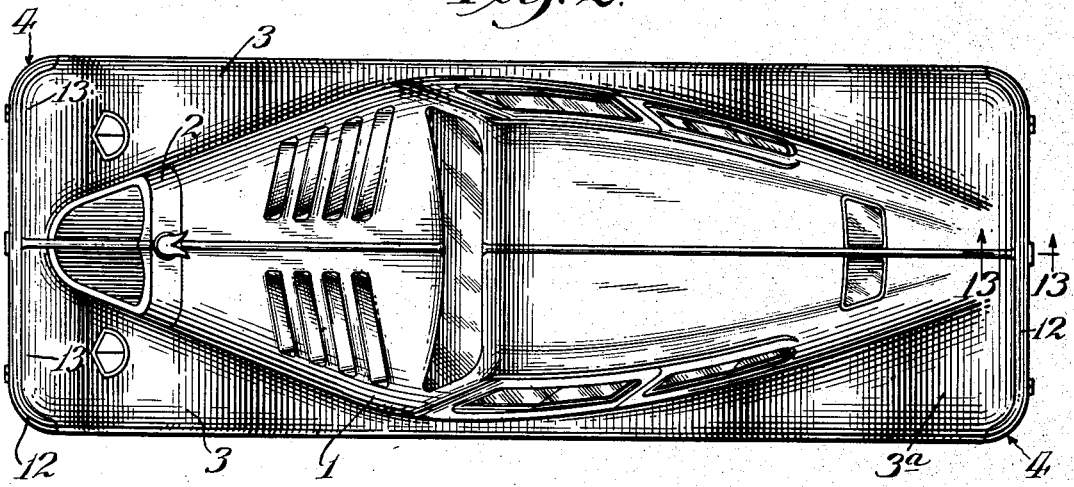
Fig. 2 is a plan view of the vehicle illustrated in Fig. 1.
Figure 3:
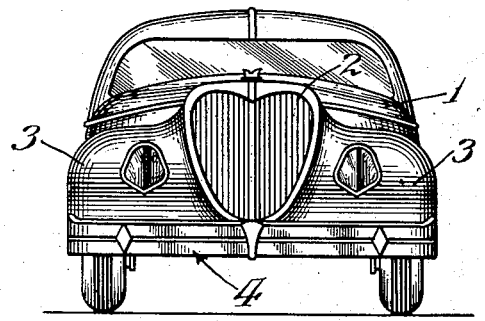
Fig. 3 is a front view of the vehicle illustrated in Fig. 1.
Figure 4:
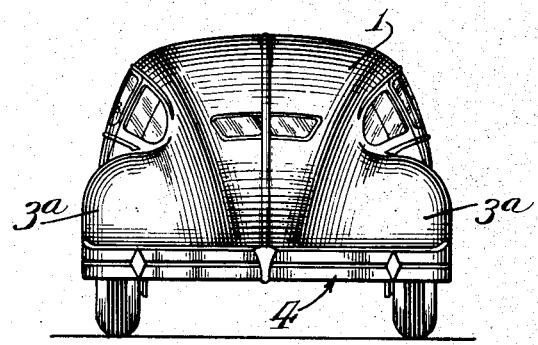
Fig. 4 is a rear view of the vehicle illustrated in Fig. 1.

In the construction herein shown I have illustrated a vehicle having a body 1 which has a narrow front portion 2 and the laterally projecting portions 3 on opposite sides thereof which cover the wheels and act as fenders. At the rear there are similar laterally projecting portions 3a. The front and rear bumper devices are of the same construction and I will describe in detail only the front device.

Referring now to the front bumper device, which is shown in Figures 5 and 12, there is a bumper element 4 which is connected to the frame of the vehicle in any desired manner. As herein shown the bumper element has the bent ends 5 to which are connected the brackets 6. A spring supporting element 7 is connected to the supporting members 8 by the fastening device 9, the supporting members 8 being attached to the frame of the vehicle. The supporting element 7 is connected at each end to the bracket 6 in any desired manner, as by means of the pins 10, the connection being such that the bumper element 4 is properly supported in position.

In the construction shown the supporting element 7 has at each end a sleeve portion 10a which fits around the pin 10, as clearly shown in Fig. 8, and the parts are held together by the nut 10b. The bumper element has a top portion 12 which projects inwardly under the edge 13 of the laterally projecting portions 3 of the vehicle, as clearly shown in Figs. 7, 9, 10, 11, and 12. There is a non-metallic packing member 14, preferably of rubber, inserted in a groove in the part 12 of the bumper element and upon which the edge 13 of the body portion rests and slides. This prevents noise due to vibrations or movement of the parts. This packing member may be made in any desired manner. I prefer to have it made of rubber and have on the outside of the rubber the rubber buttons 15 with the reduced portions 16 between them and the body of the packing member. This forms, as it were, buttons with enlarged ends. The bumper element is provided with the holes 17 which are elongated, see Figs. 15 and 18. In applying the bumper element the enlarged ends 15 of the buttons are forced through the opening 17, being deformed as shown at 15a in Fig. 15 while being passed through these openings and then enlarging as shown at 15 in Fig. 15 so that a portion thereof projects out beyond the openings, thereby holding the packing member in position. The packing member not only is rocked on the top of the bumper element but on the two ends, the holes for the buttons being clearly illustrated in Fig. 18.

There is also connected to the bumper element a series of spring members 18 which are also connected to the part 13 of the body. When the bumper element is struck these spring members bend. They are shown in their initial position in Fig. 11 and the position they are in when the bumper element is bumped in Fig. 12. In this Fig. 12 the bumper element is shown in its initial position in dotted lines and its position when struck in full lines. It will be noted that when struck more of the part 12 slides under the part 13 of the vehicle. I prefer to provide a series of rubber packing pieces 19 where the spring elements 18 are connected to the bumper element. The bumper element may be made in any shape or form desired and I have shown it made in two sections connected together by a suitable connecting piece. The rear bumper is formed in the same way as the front bumper and has the same parts which have been given the same letters, this construction being shown in Fig. 13.

It will be seen that I have provided a construction here where the bumper blends with the car body and the fenders and forms a symmetrical construction without interfering with the design or the lines of the body or its appearance.

I have shown the preferable construction where the part of the bumper element projects under the body portion 13, but it is of course evident that it may project above said body portion, the important factor being that the bumper element and the body portion overlap. When the bumper is above the body portion it will be separated therefrom by a space so as not to rub the finish on the body portion. It will be noted that in this construction the overlapping portions of the bumper element and the body portion form, as it were, a substantially closed connection between the bumper element and the body portion during all the various positions of the bumper.

I claim:

1. A bumper device for vehicles comprising a bumper support, a body having a member above said bumper support, a blow resisting bumper element, said bumper support having a resisting device connected therewith for resisting the movement of the bumper element toward the body of the vehicle, said bumper element having a portion which projects under the body portion of the vehicle so as to maintain a substantially closed connection between the bumper and the body portion during all positions of the bumper element.

2. A bumper device for vehicles comprising a bumper element having a portion which projects under the body portion of the vehicle and having a sliding connection therewith so as to maintain a substantially closed connection between the bumper and the body portion, and a non-metallic packing between the bumper element and the body portion under which it projects.

3. A bumper device for vehicles comprising a blow resisting bumper element, a resisting device for resisting the movement of the bumper element toward the body of the vehicle, said bumper element having an upper portion which extends inwardly toward the vehicle and projects under a portion of the body thereof so as to maintain a substantially closed connection between the bumper and the body portion during all positions of the body element, and a support for said bumper element connected with the frame of the vehicle which provides a sliding connection between the body and the bumper element.

4. A bumper device for vehicles comprising a bumper support, a body having a member above said bumper support, a blow resisting bumper element at each end of the vehicle, said bumper support having resisting devices for resisting the movement of the bumper elements toward the body of the vehicle, said bumper elements each having an upper portion which extends inwardly toward the vehicle and projects under a portion of the body thereof so as to maintain a substantially closed connection between the bumper and the body portion and maintain the continuity of the body from bumper to bumper.

5. A bumper device for vehicles comprising a bumper support, a body having a member above said bumper support, a bumper element at each end of the vehicle, extending crosswise of the body of the vehicle, the body and the bumper having lapping portions, the lapping portions of the body and the bumper elements moving relatively when the bumper is struck and maintaining a substantially closed connection between the bumper elements and the body in all positions of the bumper elements, so as to maintain the continuity of the body from bumper to bumper.

6. A bumper device for vehicles comprising a bumper support, a body having a member above said bumper support, a bumper element at each end of the vehicle, each bumper element having an upper portion which extends toward the vehicle and which laps a portion of the body so that it may slide back and forth with relation to said portion of the body, so as to maintain the continuity of the body from bumper to bumper.

WILLARD L. MORRISON.